(12) United States Patent
Arishima

(10) Patent No.: US 7,433,579 B2
(45) Date of Patent: Oct. 7, 2008

(54) RECORDING AND REPRODUCING APPARATUS AND REPRODUCTION PROCESSING METHOD

(75) Inventor: Yoshiaki Arishima, Kanagawa (JP)

(73) Assignee: Sony Corporation (JP)

( * ) Notice: Subject to any disclaimer, the term of this patent is extended or adjusted under 35 U.S.C. 154(b) by 615 days.

(21) Appl. No.: 10/930,249

(22) Filed: Aug. 31, 2004

(65) Prior Publication Data
US 2005/0111838 A1 May 26, 2005

(30) Foreign Application Priority Data
Sep. 1, 2003 (JP) ............................ P2003-308498

(51) Int. Cl.
*H04N 7/087* (2006.01)
(52) U.S. Cl. ........................................... 386/83
(58) Field of Classification Search ................. 386/46, 386/83, 95, 96; 348/460, 906
See application file for complete search history.

(56) References Cited

U.S. PATENT DOCUMENTS 6,571,053 B1 * 5/2003 Yasuzato ..................... 386/83

FOREIGN PATENT DOCUMENTS

| JP | 2002-051290 A | 2/2002 |
|----|---------------|--------|
| JP | 2002-152639 A | 5/2002 |
| JP | 2002-185912 A | 6/2002 |
| JP | 2003-087730 A | 3/2003 |
| WO | WO 9222983 | * 12/1992 |

* cited by examiner

*Primary Examiner*—Thai Tran
*Assistant Examiner*—Mishawn Dunn
(74) *Attorney, Agent, or Firm*—Lerner, David, Littenberg, Krumholz & Mentlik, LLP

(57) ABSTRACT

When viewing and live recording broadcast content received by a first reception unit (recording of a first content file) simultaneously with the recording of broadcast content received by a second reception unit (recording of a second content file), and when a user performs a reproduction-related operation, reproduction processing on the first content file (live recorded content file) is performed when the first reception unit and the second reception unit are receiving different channels, and reproduction processing on the second content file (the normally recorded content file) is performed when the first reception unit and the second reception unit are receiving the same channel.

12 Claims, 5 Drawing Sheets

F I G. 4
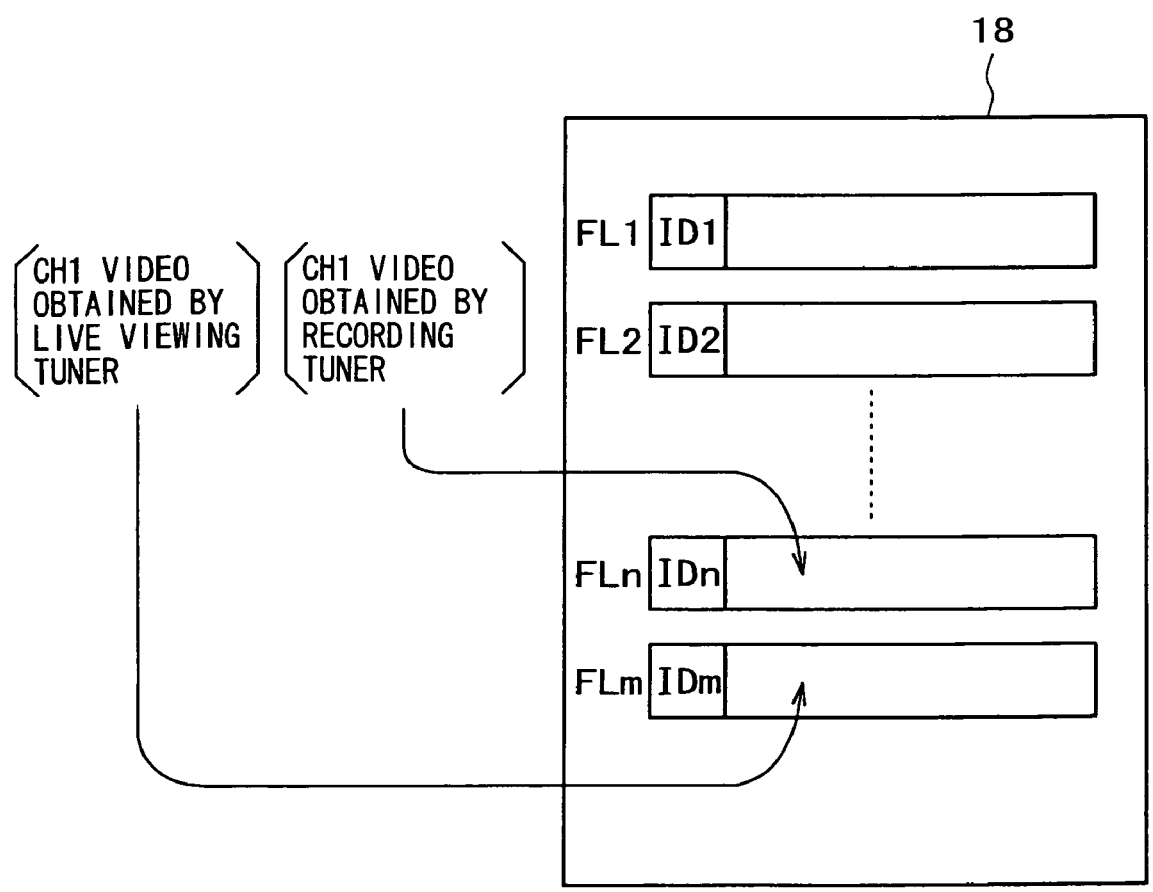

RECORDING AND REPRODUCING APPARATUS AND REPRODUCTION PROCESSING METHOD

CROSS-REFERENCE TO RELATED APPLICATIONS

The present application claims priority from Japanese Application No. 2003-308498 filed Sep. 1, 2003, the disclosure of which is hereby incorporated by reference herein.

BACKGROUND OF THE INVENTION

The present invention relates to a recording and reproducing apparatus capable of receiving, recording, and reproducing broadcast content and a reproduction processing method thereof.

Recording apparatus for recording broadcast content (programs and the like) have recently been developed, such as video recorders using a recording medium such as an HDD (Hard Disc Drive), a DVD (Digital Versatile Disc) or the like.

Various processes for recording television broadcasts and the like have been proposed as techniques applicable to these apparatus to enhance ease of operation and convenience of users, such as, for example, Japanese Patent Laid-Open No. 2002-152639. Apparatus are known which include a plurality of tuners as broadcast reception processing means, as described particularly in this Japanese patent document.

These apparatus for broadcast receiving/recording purposes include a plurality of tuners for receiving television broadcasts, for example, thereby realizing a function of recording a program while another program is viewed.

In addition, apparatus capable of performing two or more recording processes simultaneously have recently been developed.

An apparatus using an HDD as a recording medium, for example, can simultaneously record a plurality of broadcast content by a time division process or the like using one HDD when the apparatus has two tuners and two circuit systems for performing encoding for recording. The same is, of course, true for apparatus having a plurality of HDDs, apparatus having an HDD and a DVD drive unit, and the like.

Generally, in a receiving/recording apparatus having a plurality of tuners, one tuner (a recording tuner) is used for recording according to programmed recording, for example, and another tuner (a tuner used for real-time live viewing, which will hereinafter be referred to as a "live viewing tuner") is used for viewing according to a channel operation by a user.

Further, a receiving/recording apparatus capable of simultaneously recording broadcast content obtained by multiple tuners can simultaneously record a program received by a recording tuner and a program received by a live viewing tuner. Thus, the broadcast content received by the live viewing tuner according to channel operations by a user and output to a display for viewing are recorded simultaneously with the broadcast content received by the recording tuner.

This state is shown in FIGS. 1A, 1B, 1C, 1D, and 1E.

FIGS. 1A, 1B, and 1C show states of output and recording of broadcast content received by the live viewing tuner. FIGS. 1D and 1E show states of recording of broadcast content received by the recording tuner.

Suppose that, as shown in FIGS. 1D and 1E, the recording tuner performs recording of the broadcast content on Channel 1 (the channel of a broadcasting station will hereinafter be described as "ch") from a time t0 according to programmed recording or a user operation. That is, the selected channel of the recording tuner is ch1 and the recording tuner demodulates the broadcast content on ch1. The broadcast content is subjected to predetermined encoding for a recording process, and is then supplied to a recording unit, such as, for example, an HDD. That is, broadcast video on ch1 is recorded.

Meanwhile, the live viewing tuner performs reception and demodulation processing in response to a channel operation of the user. Video of a broadcast content obtained by the live viewing tuner is output to the display for viewing by the user, and is also recorded onto the HDD, for example. Incidentally, the recording of the video being viewed will be referred to as "live recording" for the sake of description to be differentiated from recording using the recording tuner. Recording using the recording tuner will be referred to as "normal recording."

As shown in FIGS. 1A, 1B, and 1C, when the user performs an operation to select ch10 at the time t0, for example, video on ch10 is recorded as a live recording, and the live video on ch10 is displayed as output video on the display for viewing by the user.

When the user performs an operation to change to ch4 at a time t1, video on ch4 is recorded as a live recording from the time t1, and the live video on ch4 is displayed as output video on the display from the time t1. Further, when the user performs an operation to change to ch1 at a time t2, video on ch1 is recorded as a live recording from the time t2, and the live video on ch1 is displayed as output video on the display from the time t2.

Such an apparatus, which performs live recording while live video is viewed, can reproduce the live recorded video when the user performs a reproduction-related operation. Incidentally, the reproduction-related operation refers to an operation related to a state of display of video reproduced from the recording medium on the display, such as, for example, program start search, fast forward, rewind or other searches, normal reproduction, and varied speed reproduction.

For example, when the user performs a rewind operation at a certain point within the period from t1 to t2 during which period the live viewing tuner receives ch4, video reproduced from the live recording of broadcast content on ch4 can be displayed on the display 12 in place of the live video on ch4. It is thereby possible to again view an immediately preceding scene in a program being viewed, for example.

Live recording is started only in response to a channel operation. Specifically, when a program on a certain channel is viewed, video from the time when a change to that channel was made has been recorded live, and the video from that time can be reproduced arbitrarily.

For example, when the user performs a program start search operation at a time t3 at which a program on ch1 is being viewed, a file recorded live from the time t2 (for example, a content file currently being recorded on the HDD) is reproduced. Since the start of the file is to be reproduced by the program start search operation, the video from the time t2 is reproduced.

Thus, as shown in FIG. 1C, the program start search operation at the time t3 changes video displayed on the display from the video at the time t3 of the program on ch1 to the live recorded video from the time t2 of the program on ch1.

Suppose in this case that, as shown in FIGS. 1D and 1E, the program on ch1, which is started at the time t0, is recorded as a normal recording using the recording tuner. That is, suppose that the user is viewing the program recorded from the time t0 live from the time t2, which is an intermediate point in the program. In this case, the user often desires to view the program from the start (that is, from program content at the time t0) rather than from the intermediate point.

Even when the user thus intends to view the program from the start by changing from live viewing to reproduction viewing, the live recorded file as described above is reproduced by the program start search operation. The user is therefore able to view only program content from the time t2.

As described above, when a reproduction-related operation is performed during live viewing, the apparatus recognizes the reproduction-related operation as an operation on the video file recorded live during the live viewing, and performs reproduction processing on the live recorded video, because it is generally considered suitable for use by the user. In other words, when the user desires to view an immediately preceding scene in the program being viewed live, for example, requiring the user to perform a complex menu operation or mode operation or the like to view the live recorded video will greatly degrade ease of operation.

Thus, reproduction processing on the live recorded file is performed in response to the reproduction-related operation during the live viewing. However, as described above, it then becomes impossible to view reproduced video from the start of the program on ch1, for example, by the reproduction-related operation during the live viewing even when the program is recorded from the start by normal recording using the recording tuner.

For example, when the user starts viewing a desired program at an intermediate point thereof but decides to view the program from the start since the program is recorded, it is very desirable that video from the start of the program be reproduced with a single program start search operation. However, such reproduction processing is not performed.

Of course, broadcast content recorded (or being recorded) on the recording tuner side can be reproduced in response to a user operation.

For example, by calling up a screen of a list of titles recorded (or being recorded) by a menu operation, selecting a title currently being received and recorded on the recording tuner side (the file of the recorded video on ch1, the normal recording of which is started at the time t0), and performing a reproducing operation, it is possible for the user to view reproduced video from the start of the desired program in the above case. However, such operations are complicated and troublesome, and are therefore not desirable to the user.

In summary, it is desirable considering ease of operation of the user that an apparatus simultaneously performing normal recording using the recording tuner and live recording of a program on a channel being viewed recognize a reproduction-related operation during viewing as an operation on a file being recorded live at that point in time, and accordingly perform reproduction processing. However, when the normal recording using the recording tuner and the live recording of the program on the channel being viewed are performed on the same channel, reproduction processing performed on the live recorded file in response to a reproduction-related operation may not be desirable to the user.

SUMMARY OF THE INVENTION

It is an object of the present invention to enhance ease of operation and improve convenience for the user in a recording and reproducing apparatus such as a video recorder or the like that has a plurality of reception units and that can record and reproduce broadcast content signals received by the individual reception units simultaneously.

According to the present invention, there is provided a recording and reproducing apparatus including a first reception unit and a second reception unit operable to receive content signals; a recording and reproduction unit operable to simultaneously record onto a recording medium the respective content signals received by the first and second reception units and to reproduce the recorded content signals, the content signal received by the first reception unit being recorded on the recording medium as a first content file, and the content signal received by the second reception unit being recorded on the recording medium as a second content file; an output processing unit operable to output to an output unit the content signal received by the first reception unit and a content signal reproduced from the recording medium; an operating unit operable to perform reproduction-related operations on the content signals recorded on the recording medium; and a control unit operable to perform reproduction-related processing on the second content file when a reproduction-related operation is performed by the operating unit and the first and second reception units are receiving content signals from an identical channel during simultaneous recording while the content signal received by the first reception unit is being output to the output unit.

According to the present invention, there also is provided a reproduction processing method, including recording a first content signal received by a first reception unit onto a recording medium as a first content file while outputting the first content signal to an output unit; recording a second content signal received by a second reception unit onto the recording medium as a second content file; performing reproduction-related processing on the second content file when a reproduction-related operation is performed while the first and second reception units are receiving content signals from an identical channel and the steps of recording the first and second content signals are being performed simultaneously.

According to the present invention, when a user who is viewing live video of a broadcast content received and demodulated by the first reception unit performs a reproduction-related operation, reproduction processing on the most appropriate content file for the user among the recorded content files is performed.

Specifically, since a reproduction-related operation during viewing by the user usually requests reproduced video of a program being viewed, when live recording of a broadcast content obtained by the first reception unit and normal recording of a broadcast content obtained by the second reception unit are recording programs of different channels, it is appropriate that reproduction processing on live recorded video (first content file) be performed. On the other hand, when the live recording of the broadcast content obtained by the first reception unit and the normal recording of the broadcast content obtained by the second reception unit are recording a program of the same channel, since the normally recorded video (the second content file) is often recorded from the start of the program, it is appropriate that reproduction processing on the second content file be performed when the user requests the reproduction.

According to the present invention, when viewing and live recording of a broadcast content obtained by the first reception unit (recording of a first content file) and normal recording of a broadcast content obtained by the second reception unit (recording of a second content file) are performed simultaneously, and when a user performs a reproduction-related operation, reproduction processing on the first content file is performed when the first and second reception units are receiving different channels, and reproduction processing on the second content file is performed when the first and second reception units are receiving the same channel. Thereby, when the user performs an operation to request reproduction during viewing, it is possible to perform reproduction processing on the appropriate content file. That is, the user can view the immediately preceding video of a program currently being viewed and the video from the start of the program by a simple operation during viewing, whereby ease of operation and convenience can be greatly enhanced.

BRIEF DESCRIPTION OF THE DRAWINGS

FIG. 4 is a diagram of assistance in explaining content files recorded according to the embodiment of FIG. 2.

DETAILED DESCRIPTION

An embodiment of the present invention will hereinafter be described by taking as an example a recording and reproducing apparatus (digital video recorder) capable of digitally recording a program of an analog television broadcast.

Figure 1:
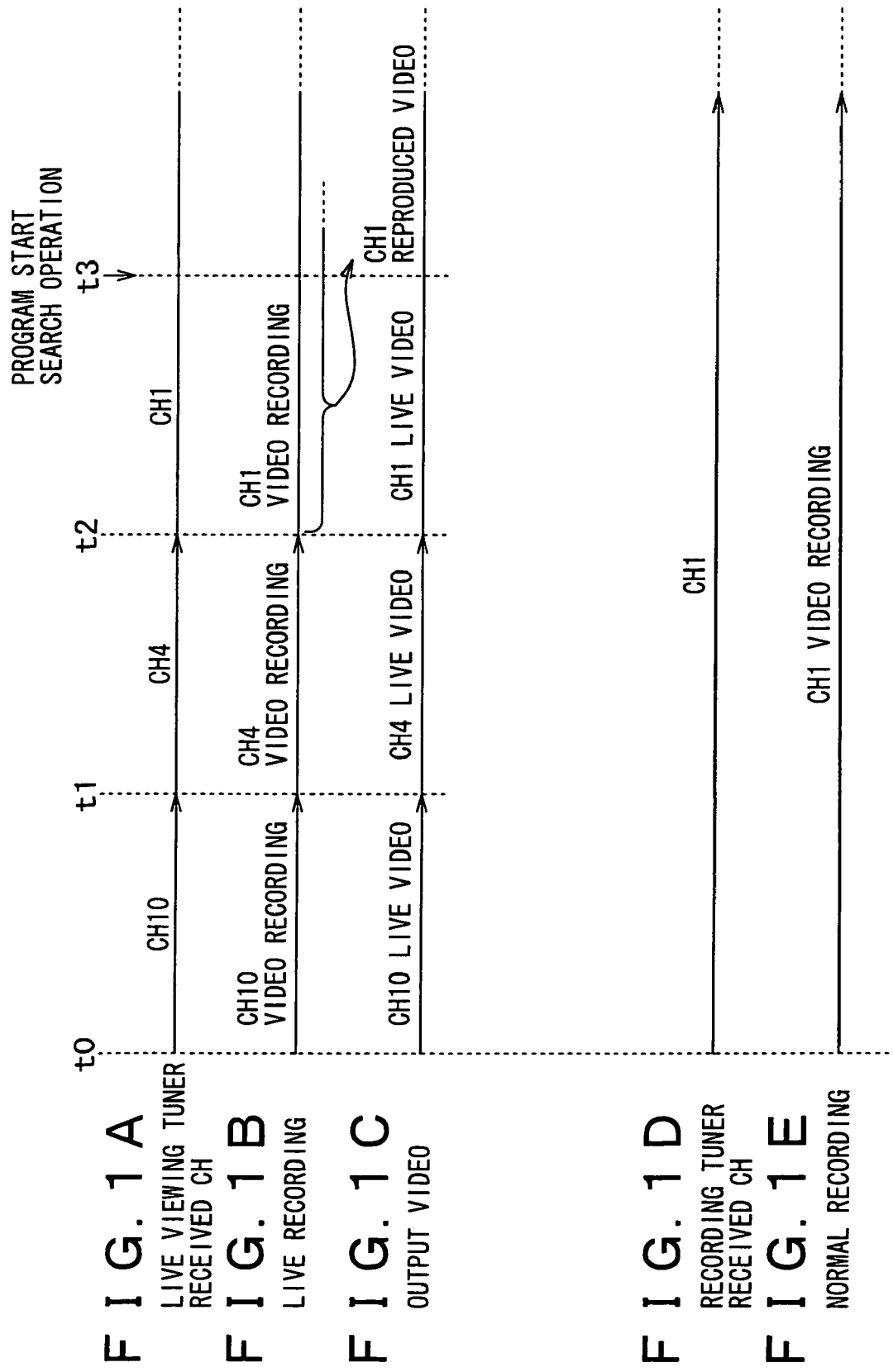
FIGS. 1A, 1B, 1C, 1D, and 1E are diagrams of assistance in explaining conventional recording, video output, and reproduction processing.
Figure 2:
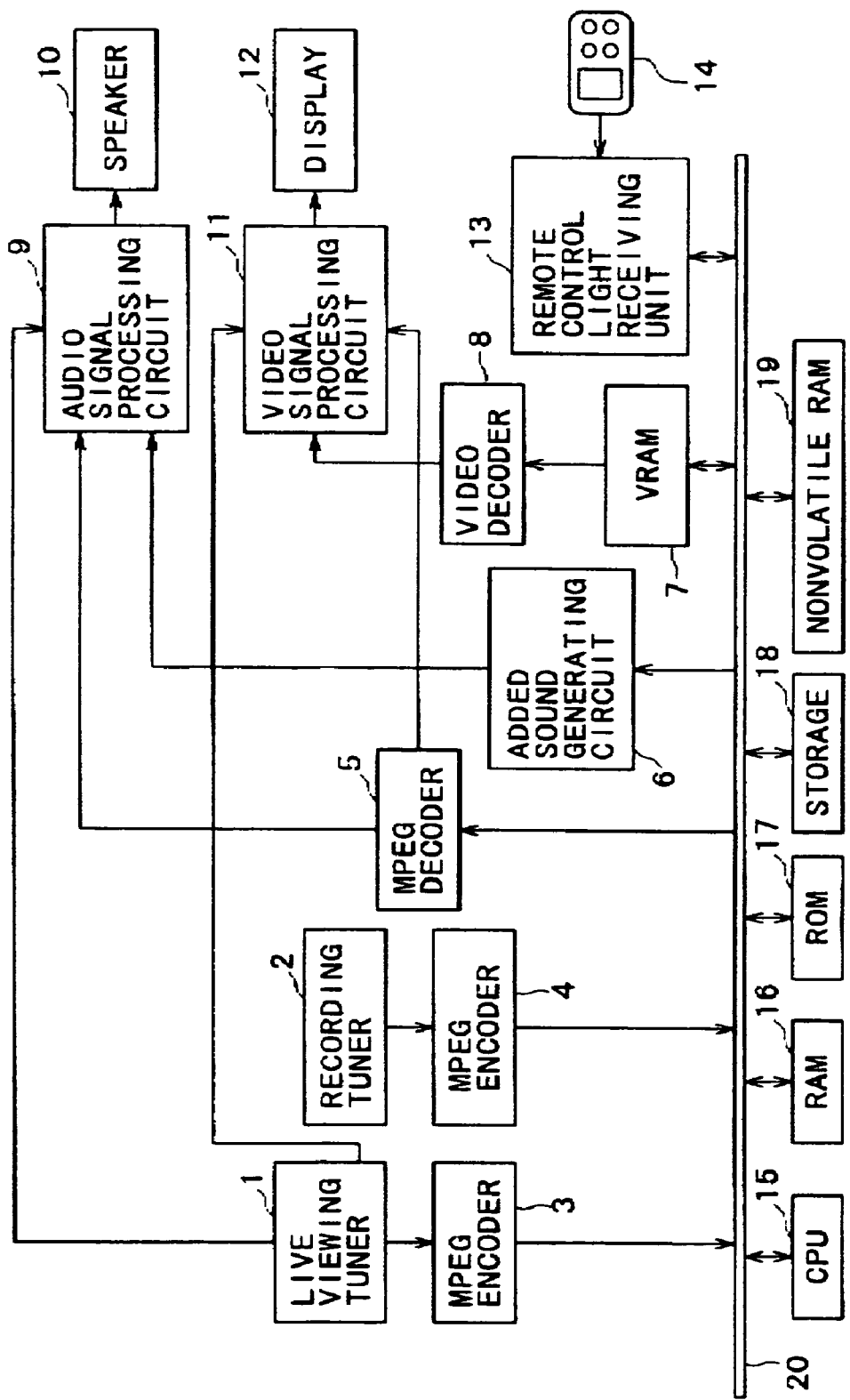
FIG. 2 is a block diagram of a recording and reproducing apparatus according to an embodiment of the present invention.

FIG. 2 is a block diagram showing an example of the configuration of hardware of a digital video recorder according to the present embodiment, the digital video recorder being capable of receiving an analog broadcast and digitally recording the analog broadcast.

Tuners 1 and 2 each support analog television broadcasting. It is to be noted that while the tuners 1 and 2 are described as a device supporting analog television broadcasting in the embodiment, the tuners 1 and 2 may of course support digital terrestrial broadcasting, digital satellite broadcasting and the like.

The tuners 1 and 2 extract a signal of a program desired by a user from signals of a plurality of programs (broadcast content) received by an antenna not shown in the figure under control of a CPU 15, and output the signal to MPEG (Motion Picture Experts Group) encoders 3 and 4, respectively.

In this case, the tuner 1 is a live viewing tuner used for real-time live viewing.

The live viewing tuner 1 therefore performs channel selection, reception, and demodulation in response to a channel operation by the user. The live viewing tuner 1 outputs an audio signal and a video signal of a received program to an audio signal processing circuit 9 and a video signal processing circuit 11, respectively, for viewing by the user.

The video signal and the audio signal of the program obtained by the live viewing tuner 1 are also output to the MPEG encoder 3 as described above to be processed for recording. This is to live record the program being viewed as it is.

On the other hand, the tuner 2 is a recording tuner provided for normal recording, that is, programmed recording, automatic recording (which, though not described in detail, is recording that automatically selects a program on the basis of a history of viewing by the user or a history of recording, for example), manual recording (recording started by a user operation), or the like other than live viewing recording.

A video signal and an audio signal of a program obtained by the recording tuner 2 are output to the MPEG encoder 4 as described above to be processed for recording.

Incidentally, while the live viewing tuner 1 and the recording tuner 2 are clearly distinguished from each other in this example, it is possible to use a plurality of tuners flexibly, with one of the tuners used as a live viewing tuner and another used as a recording tuner.

In this case, it suffices in terms of configuration to be able to supply video signals and audio signals obtained by both of the tuners to an encoder system for recording and an audio/video signal processing circuit system for user viewing.

The MPEG encoders 3 and 4 encode the program signal supplied from the tuners 1 and 2, respectively, by subjecting the program signal to compression processing and the like on the basis of an MPEG system. That is, the MPEG encoders 3 and 4 perform encoding for video recording (picture recording).

Data encoded by the compression processing and the like is supplied to a storage unit 18 via a bus 20, and then recorded in the storage unit 18. For example, one program is stored as one video content file (content file).

Incidentally, a title ID is added to each recorded content file. This will be described later.

In reproducing a content file compressed by the MPEG system and stored in the storage unit 18, an MPEG decoder 5 reads the reproduced data stream via the bus 20, and decodes the data stream. An audio signal and a video signal obtained by decoding the data stream are output to the audio signal processing circuit 9 and the video signal processing circuit 11, respectively.

An added sound generating circuit 6 generates an operating sound or an added sound when the user operates a remote commander 14, and outputs the operating sound or the added sound to the audio signal processing circuit 9.

A video decoder 8 reads image data for display stored in a VRAM (Video RAM) 7, and converts the image data into a video signal. The converted video signal is supplied to the video signal processing circuit 11.

The audio signal processing circuit 9 subjects the audio data supplied from the tuner 1 or 2 or the MPEG decoder 5 to D/A (Digital to Analog) conversion, subjects the audio data to sound processing, amplification processing and the like, and then outputs the audio data to a speaker 10 connected to the audio signal processing circuit 9. When an added sound is supplied from the added sound generating circuit 6, however, the audio signal processing circuit 9 subjects the audio data supplied from the tuner 1 or 2 or the MPEG decoder 5 to D/A conversion, combines the audio signal and the added sound with each other, and then outputs a resulting audio signal to the speaker 10.

The video signal processing circuit 11 subjects the video data supplied from the television tuner 1 or 2 or the MPEG decoder 5 to D/A conversion, and then outputs the video data to a display 12 connected to the video signal processing circuit 11. When image data for display is supplied from the video decoder 8, however, the video signal processing circuit 11 combines the video data supplied from the television tuner 1 or 2 or the MPEG decoder 5 and the image data for display with each other, subjects the result to D/A conversion, and then outputs a resulting video signal to the display 12.

The speaker 10 outputs the audio signal supplied from the audio signal processing circuit 9. The display 12 displays (reproduces) the video signal supplied from the video signal processing circuit 11.

The speaker 10 and the display 12 may be provided integrally within the recording apparatus, or may be connected as a separate device to the recording apparatus.

When the user operates the remote commander 14 that outputs an infrared signal, for example, a remote control light receiving unit 13 receives the light of an operating signal, converts the operating signal into an operation command signal formed by an electric signal, and then outputs the operation command signal to the CPU 15. Of course, the remote commander 14 may use not only the infrared system but also radio waves, for example.

The remote commander 14 and the remote control light receiving unit 13 are parts enabling the user to supply various operation inputs. For example, various user operations such as a channel change operation, a reproduction-related operation and the like are performed by using the remote commander 14.

At the time of an operation using the remote commander 14, a menu screen or the like is displayed as a GUI using the display 12. A video signal for such GUI display is generated by the VRAM 7 and the video decoder 8 mentioned above.

Incidentally, though not shown in the figure, in addition to the remote commander 14, operating elements may be formed on a panel of a casing of the apparatus to allow various operation inputs.

The CPU (Central Processing Unit) 15 performs various processing according to a program stored in a ROM (Read Only Memory) 17 or the storage unit 18 when an operating signal (command) is input from the remote control light receiving unit 13.

A RAM 16 temporarily stores a starting module, a platform software program such as an OS or the like, or an application program stored in the ROM 17 or the storage unit 18, or a parameter changed as required in execution of the program.

The ROM 17 stores the starting module and the platform software module for operating the CPU 15.

A nonvolatile RAM 19 includes a memory card or a flash memory, for example. The nonvolatile RAM 19 stores authentication information, billing information, and preference information of the user and the like.

The storage unit 18 includes a magnetic hard disk or a recordable DVD disk, for example. The storage unit 18 stores video content, data (metadata) related to the video content, EPG information and the like.

In addition, data encoded by the MPEG encoders 3 and 4 as described above is recorded on the storage-unit 18. That is, the storage unit 18 is a medium onto which broadcast content received in the recording apparatus is recorded.

As shown in FIG. 2, the digital video recorder in this example can perform live recording by a system of the viewing tuner 1 and the MPEG encoder 3 and perform normal recording, such as, for example, programmed recording, automatic recording, and manual recording, by a system of the recording tuner 2 and the MPEG encoder 4. For example, recording onto the storage unit 18 using an HDD can be performed by these two systems simultaneously. Also, it is possible to reproduce a content file in the process of being recorded.

States of live recording and normal recording performed in this example will be described with reference to FIGS. 3A, 3B, 3C, 3D, and 3E.

Figure 3:
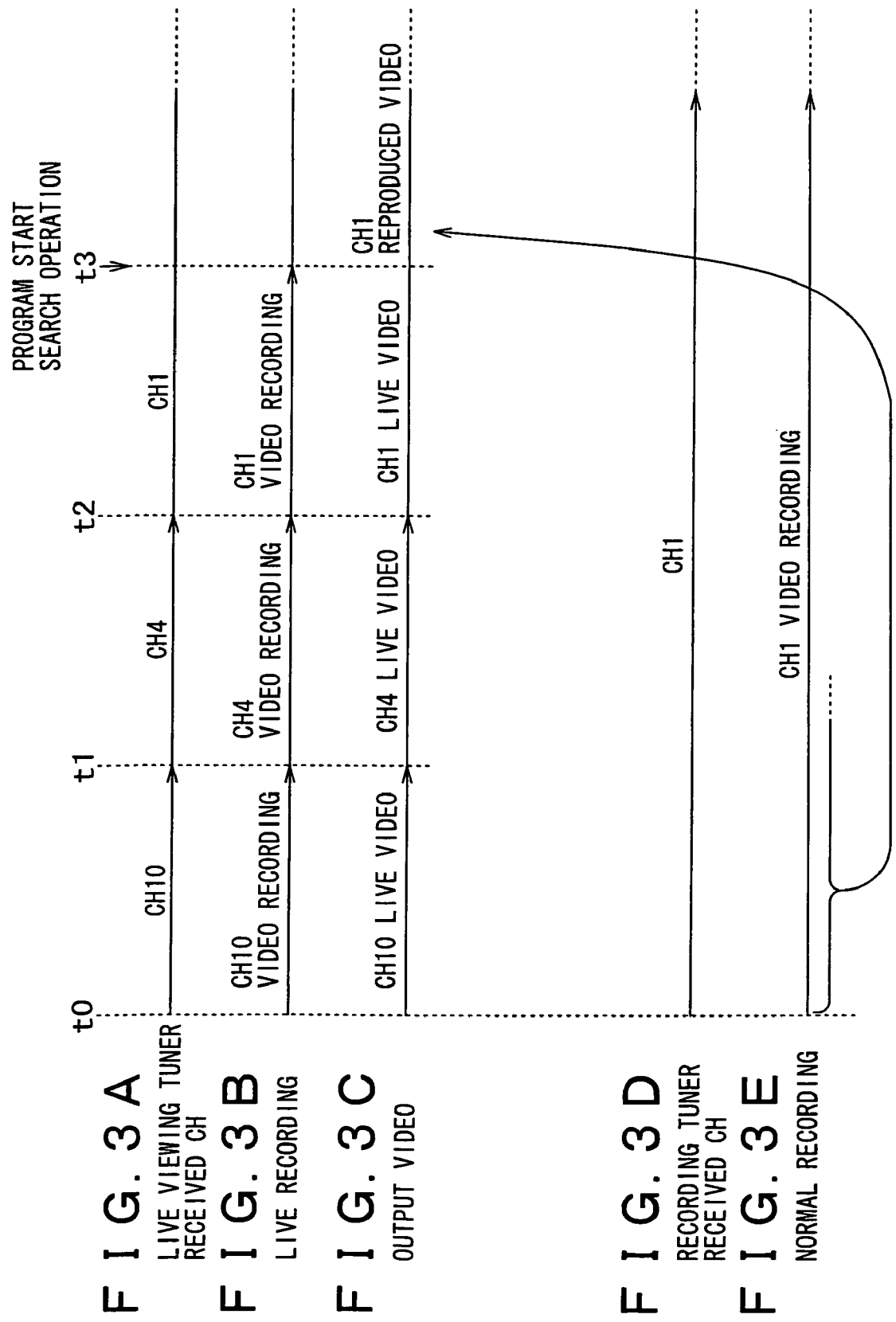
FIGS. 3A, 3B, 3C, 3D, and 3E are diagrams of assistance in explaining recording, video output, and reproduction processing according to the embodiment of FIG. 2.

FIGS. 3A, 3B, and 3C show states of a channel received by the live viewing tuner 1, live recording, and output video for viewing by the user. FIGS. 3D and 3E show states of a channel received by the recording tuner 2 and normal recording of a received broadcast content.

Suppose that as shown in FIGS. 3D and 3E, the recording tuner performs recording on Channel 1 (ch1) from a time t0 as programmed recording, automatic recording, or manual recording, for example. That is, the selected channel of the recording tuner 2 is ch1 and the recording tuner 2 demodulates the broadcast content on ch1. A video signal and an audio signal obtained by demodulating the broadcast content are processed by the MPEG encoder 4, and then supplied to the storage unit 18 to be recorded therein as one content file. That is, broadcast video on ch1 is recorded.

Meanwhile, the live viewing tuner 1 performs reception and demodulation processing in response to a channel operation of the user. A video signal and an audio signal of a broadcast content obtained are supplied to the video signal processing circuit 11 and the audio signal processing circuit 9, and then output from the display 12 and the speaker 10. At the same time, the video signal and the audio signal obtained by the live viewing tuner 1 are processed by the MPEG encoder 3, and then supplied to the storage unit 18 to be recorded therein as one content file. That is, video currently being viewed by the user is recorded live.

As shown in FIGS. 3A, 3B, and 3C, when the user performs an operation to select ch10 at the t0 time, for example, video on ch10 is recorded as a live recording, and the live video on ch10 is displayed as output video on the display 12 for viewing by the user.

When the user performs an operation to change to ch4 by using the remote commander 14 at a time t1, video on ch4 is recorded as a live recording from the time t1, and the live video on ch4 is displayed as output video on the display from the time t1.

Further, when the user performs an operation to change to ch1 at a time t2, video on ch1 is recorded as a live recording from the time t2, and the live video on ch1 is displayed as output video on the display from the time t2.

A different title ID is given to the content file recorded in the storage unit 18 for each program (one recording unit).

One title ID is set to a content file recorded by programmed recording or the like as shown in FIG. 3E, for example. As for the live recording of FIG. 3B, one content file is generated at the time of changing channels, and one title ID is given to each content file.

For example, the recording of the video on ch10 for a period from t0 to t1 forms one content file, and one title ID is given to the content file. The recording of the video on ch4 for a period from t1 to t2 forms another content file, and another title ID is given to the content file.

FIG. 4 shows content files formed in the storage unit 18 after the time t2.

Content files FL1, FL2, ... represent content files recorded before the time t2. A unique code is given as a title ID (ID1, ID2, ...) to each of the content files.

In a period after the time t2, the user is viewing ch1, and therefore live recording of ch1 is performed. Thus, the video signal and the audio signal obtained by the live viewing tuner 1 are being recorded as a content file FLn shown in FIG. 4. As for normal recording of the video signal and the audio signal obtained by the recording tuner 2, a program on ch1 continues being recorded after the time t0. This program is being recorded as a content file FLn.

In this case, a title ID (IDm) is given to the content file FLn, and a title ID (IDn) is given to the content file FLn.

The digital video recorder in this example performs live recording during viewing of live video, and is thus able to output reproduced video of a program being viewed when the user performs a reproduction-related operation. As described above, the reproduction-related operation refers to an operation related to a state of display of video reproduced from the recording medium on the display, such as, for example, program start search, fast forward, rewind or other searches, normal reproduction, and varied speed reproduction.

For example, when the user performs an operation for rewind at a certain point within the period from t1 to t2 during which period the live viewing tuner 1 receives ch4, the digital video recorder can reproduce a content file from the storage unit 18 obtained by live recording of ch4, and display the reproduced video on the display 12 in place of the live video on ch4. It is thereby possible to view again an immediately preceding scene in a program being viewed, for example.

However, a live recorded content file is thus reproduced in response to a reproduction-related operation during viewing in cases where the channels of the live viewing tuner 1 and the recording tuner 2 are not the same, that is, in cases where the programs of a content file being normally recorded at that point in time and the live recorded content file are different from each other, or in cases where normal recording is not performed.

In cases where the channels of the live viewing tuner 1 and the recording tuner 2 are the same when the reproduction-related operation is performed, that is, in cases where the programs of the content file being normally recorded at that point in time and the live recorded content file are the same, the content file being normally recorded by using the recording tuner 2 is reproduced in response to the reproduction-related operation.

Suppose, for example, that the user performs a program start search operation at a time t3 at which a program on ch1 is being viewed. At this time, the content file FLn recorded live from the time t2 and the content file FLn normally recorded from the time t0 using the recording tuner 2 have program contents of the same channel.

In such a case, the content file FLn is processed as a file to be reproduced in response to the program start search operation, and the content file FLn is reproduced from a start thereof, for example.

Thus, as shown in FIGS. 3A to 3E, reproduced video from the start of the content file FLn being normally recorded using the recording tuner 2 is displayed on the display 12 after the time t3 at which the program start search operation is performed.

That is, in this example, in a case where a reproduction-related operation is performed during viewing while simultaneous recording using both the systems of the tuners 1 and 2, when content files being recorded simultaneously are programs of different channels, reproduction processing is performed on the content file being recorded live at that point in time. On the other hand, when the content files being recorded simultaneously are a program of the same channel, reproduction processing is performed on the content file being normally recorded by the system of the recording tuner 2.

The user can thereby have an appropriate reproduction performed of a program currently being viewed by a simple operation.

Thus, when content files being recorded simultaneously are different programs, reproduced video of the program being viewed is displayed by reproducing the content file being recorded live. Therefore, an operation for viewing an immediately preceding scene again, for example, can be performed easily.

On the other hand, when the content files being recorded simultaneously are the same program, reproduced video of the program being viewed can be displayed by reproducing either of the content files. However, the content file normally recorded by programmed recording, automatic recording, manual recording or the like often includes video from the start of the program. Hence, it becomes possible not only to view an immediately preceding scene again but also to view the program from the start when reproduction processing is performed on the content file normally recorded by the system of the recording tuner 2. The user can achieve such an operation without distinguishing the recording systems and the content files. Thus, ease of operation and convenience are enhanced.

The control of the CPU 15 for realizing the above-described reproduction processing will be described in the following with reference to FIG. 5.

Figure 5:
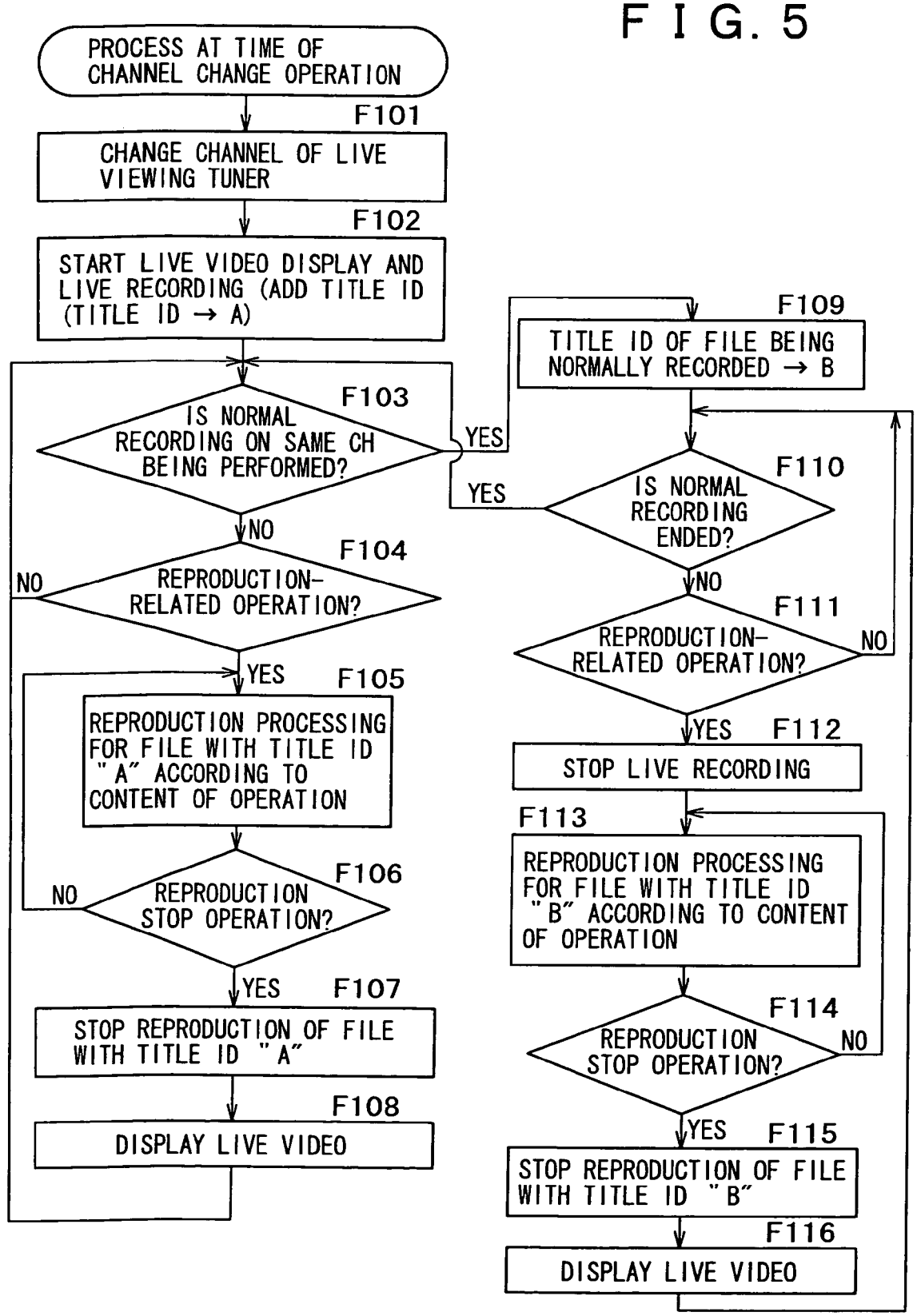
FIG. 5 is a flowchart of a process at a time of channel change according to the embodiment of FIG. 2.

FIG. 5 represents a process performed at and after a time when the user performs a channel change operation using the remote commander 14 during live viewing. Though this flowchart does not show timing of ending the process for simplicity of description, the process that has been performed is ended when the user performs a channel change operation during the performance of the process of FIG. 5, and then a process from step F101 is restarted. Of course, the process of FIG. 5 may be ended by another operation for performing a function, an operation for turning off power, or the like.

When the user performs a channel change operation, the CPU 15 starts the process from step F101. In the first step F101, the channel received by the live viewing tuner 1 is changed to a channel specified by the user. Hence, the live viewing tuner 1 performs reception and demodulation on the channel specified by the user.

In step F102, the CPU 15 starts live video display and live recording of a signal of the received and demodulated broadcast content. Thus, a program on the channel is output for viewing by the user from the display 12 and the speaker 10. At the same time, a video signal and an audio signal encoded by the MPEG encoder 3 are recorded live as one content file in the storage unit 18. At this time, the CPU 15 retains a title ID added to the content file being recorded live as a variable (register) A.

In step F103, the CPU 15 determines whether normal recording on the same channel as that of the live recording started as described above is being performed. That is, the CPU 15 determines whether recording using the recording tuner 2 is being performed, and when recording using the recording tuner 2 is being performed, the CPU 15 determines whether the channel of the recording tuner 2 is the same as the current channel of the live viewing tuner 1.

When recording of the program on the same channel as that of the live recording is not being performed as normal recording using the recording tuner 2, the process proceeds to step F104. In step F104, the CPU 15 monitors a reproduction-related operation by the user. During a period when no reproduction-related operation is performed, the output for viewing and the live recording started in step F102 are continued. During this period, the process returns from step F104 to step F103. Thus, in conditions in which no reproduction-related operation is performed and recording of the same channel as that of the live recording is not started as normal recording using the recording tuner 2, a process in a loop including steps F103 and F104 is repeated.

When a reproduction-related operation by the user is detected in step F104, the process of the CPU 15 proceeds to step F105 to process the content file with the title ID retained as the variable A according to the content (program start search, search, reproduction or the like) of the detected operation. That is, the content file currently being recorded live is processed. For example, when the reproduction-related operation is performed at a time within the period from t1 to t2 in FIGS. 3A to 3E, the CPU 15 instructs the storage unit 18 to perform processing for reproduction, search or the like according to the detected operation with respect to the live recording on ch4, and makes the MPEG decoder 5 supply reproduced video and reproduced audio to the video signal processing circuit 11 and the audio signal processing circuit 9 to output the reproduced video and the reproduced audio from the display 12 and the speaker 10.

The processing according to various reproduction-related operations by the user in step F105 is performed until a reproduction stop operation by the user is detected in step F106. Thus, the user can view the video recorded live arbitrarily by performing an operation for program start search, fast reverse, reproduction, fast forward, pause or the like.

When the user performs a reproduction stop operation, the process of the CPU 15 proceeds from step F106 to F107, where reproduction processing on the content file with the title ID retained as the variable A is ended. In step F108, a state for viewing live video is restored. That is, a state is restored in which the video signal processing circuit 11 and the audio signal processing circuit 9 output a video signal and an audio signal received and demodulated by the live viewing tuner 1 from the display 12 and the speaker 10. The process then returns to step F103.

Incidentally, live recording of the content file for the reproduction processing is continued in the period corresponding to the processing from step F105 to step F108. That is, the reproduction processing in step F105 is reproduction processing on an already recorded part of the content file currently being recorded live.

When the CPU 15 determines that normal recording of the same channel as the channel being recorded live is being performed using the recording tuner 2 after the process proceeds from step F101 to F102 to F103 in response to a channel change operation or while the loop process including steps F103 and F104 is being performed, the process of the CPU 15 proceeds to step F109. First, the title ID of the content file being normally recorded using the recording tuner 2 is retained as a variable (register) B.

Then, in step F110, the CPU 15 monitors an end of the normal recording. In step F111, the CPU 15 monitors a reproduction-related operation by the user.

When an end of the normal recording is detected without a reproduction-related operation being performed in a monitoring loop including steps F110 and F111, the process returns to step F103.

When a reproduction-related operation by the user is detected in step F111, the process of the CPU 15 proceeds to step F112 to stop the live recording being performed. That is, the recording of the content file with the title ID of the variable A, which recording is performed from step F102 in the storage unit 18, is ended.

Then, in step F113, the content file with the title ID retained as the variable B is processed according to the content (program start search, search, reproduction or the like) of the reproduction-related operation by the user.

This corresponds to a process at the time t3 in FIGS. 3A to 3E, for example. When a program start search operation is performed at the time t3, reproduction-related processing (program start search and subsequent reproduction in this case) is performed on the content file being normally recorded using the recording tuner 2, as shown in FIGS. 3A to 3E. Thus, the storage unit 18 performs program start search and reproduction of the content file with the title ID "B", which file is obtained by normal recording, and reproduced video and reproduced audio are supplied by the MPEG decoder 5 to the video signal processing circuit 11 and the audio signal processing circuit 9 so that the reproduced video and the reproduced audio are output from the display 12 and the speaker 10.

The processing according to various reproduction-related operations by the user in step F113 is performed until a reproduction stop operation by the user is detected in step F114. Thus, the user can arbitrarily view the video normally recorded using the recording tuner 2 by performing an operation for program start search, fast reverse, reproduction, fast forward, pause or the like.

When the user performs a reproduction stop operation, the process of the CPU 15 proceeds from step F114 to F115, where reproduction processing on the content file with the title ID retained as the variable B is ended. In step F116, a state for viewing live video is restored. That is, a state is restored in which the video signal processing circuit 11 and the audio signal processing circuit 9 output a video signal and an audio signal received and demodulated by the live viewing tuner 1 from the display 12 and the speaker 10. The process then returns to step F110.

Incidentally, normal recording (recording using the recording tuner 2) of the content file for the reproduction processing is continued in the period corresponding to the processing from step F112 to step F116 until an originally set end time. That is, the reproduction processing in step F113 is reproduction processing on an already recorded part of the content file currently being normally recorded. Of course, when a recording end time determined in setting programmed recording, automatic recording, manual recording or the like arrives during the reproduction-related processing in step F113, the recording of the content file is ended.

By performing the processing of FIG. 5 after a channel change operation, the reproduction operation as described with reference to FIGS. 3A to 3E is realized. Specifically, when the user performs a reproduction-related operation during live viewing and recording of the same channel as the channel being normally recorded using the recording tuner 2, reproduction processing is performed on the content file being normally recorded. On the other hand, when the channel being normally recorded and the channel being viewed are different from each other, reproduction processing is performed on the content file being recorded live. Thus, as described above, reproductions suitable for the user can be realized.

While an embodiment has been described above, various modifications and applications of the present invention are conceivable. While it is assumed in the embodiment described above that the recording and reproducing apparatus has a function of receiving analog terrestrial broadcasts, for example, the apparatus may of course have a tuner for receiving BS broadcasts or digital BS or terrestrial broadcasts. It is also conceivable that the recording and reproducing apparatus has a tuner supporting cable television broadcasts and various other broadcasts.

Further, the recording and reproducing apparatus has a plurality of recording systems using these tuners. The present invention is thus applicable to apparatus having three or more recording systems.

Further, while in the embodiment described above, an apparatus including a storage unit for recording broadcast content is taken as an example, the present invention is applicable to apparatus connected to an external recording device, such as an HDD or a disk drive device, for example, and that record broadcast content onto a recording medium in the connected recording device.

Further, while in the embodiment described above the apparatus records broadcast content, the present invention is applicable to apparatus recording audio broadcasts. Thus, it is conceivable that various forms of recording and reproducing apparatus for recording and reproducing various broadcast content are realized.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A recording and reproducing apparatus, comprising:
a first reception unit and a second reception unit operable to receive content signals;
a recording and reproduction unit operable to simultaneously record onto a recording medium the respective content signals received by the first and second reception units and to reproduce the recorded content signals, the content signal received by the first reception unit being recorded on the recording medium as a first content file, and the content signal received by the second reception unit being recorded on the recording medium as a second content file;
an output processing unit operable to output to an output unit the content signal received by the first reception unit and a content signal reproduced from the recording medium;
an input unit operable to input a user request to perceive the content; and
a control unit operable to control reproduction such that when (1) a user is perceiving content of the content signal being received by the first reception unit, (2) the content signal being received by the second reception unit is the same as the content signal being received by the first reception unit, and (3) the user submits a request to perceive a part of the content corresponding to a part of the content signal which has previously been received, the corresponding part of the content signal is reproduced from the second content file and the content associated with such reproduction is presented to the user.

2. A recording and reproducing apparatus as claimed in claim 1, wherein the control unit is operable to perform reproduction-related processing on the first content file when a reproduction-related operation is performed and the first and second reception units are receiving content signals from different channels during the simultaneous recording.

3. A recording and reproducing apparatus as claimed in claim 1, wherein the step of recording the content signals includes recording broadcast content.

4. A recording and reproducing apparatus as claimed in claim 1, wherein the step of recording the content signals includes recording audio broadcasts.

5. A recording and reproducing apparatus as claimed in claim 1, wherein reproduction-related processing includes a process selected from the group consisting of program start search, fast forward, fast reverse, normal reproduction, and varied speed reproduction.

6. A recording and reproducing apparatus as claimed in claim 1, wherein the recording of the content signal onto the recording medium as the first content file is started in response to a reproduction-related operation.

7. A recording and reproducing apparatus as claimed in claim 1, wherein content from a time of channel change is recorded onto the recording medium as the first content file in response to a reproduction-related operation.

8. A recording and reproducing apparatus as claimed in claim 1, wherein the step of recording the content signal onto the recording medium as the second content file is performed by a normal recording process selected from the group consisting of a programmed recording process, an automatic recording process, and a manual recording process.

9. A recording and reproducing apparatus as claimed in claim 8, wherein the automatic recording process includes automatically selecting a content based on a history of viewing by a user and a history of recording by the user.

10. A recording and reproducing apparatus as claimed in claim 1, wherein a unique code is applied to each of the first and second content files recorded on the recording medium.

11. A reproduction processing method, comprising the steps of:
recording a first content signal received by a first reception unit onto a recording medium as a first content file while outputting the first content signal to an output unit;
recording a second content signal received by a second reception unit onto the recording medium as a second content file;
whereby when (1) a user is perceiving content of the content signal being received by the first reception unit, (2) the content signal being received by the second reception unit is the same as the content signal being received by the first reception unit, and (3) the user submits a request to perceive a part of the content corresponding to a part of the content signal which has previously been received, the corresponding part of the content signal is reproduced from the second content file and the content associated with such reproduction is presented to the user.

12. A reproduction processing method as claimed in claim 11, wherein performing a reproduction-related operation includes performing a reproduction-related processing on the first content file when the reproduction-related operation is performed while the first and second reception units are receiving content signals from different channels and the steps of recording the first and second content signals are being performed simultaneously.

* * * * *